US008549053B2

(12) United States Patent
Royall, Jr. et al.

(10) Patent No.: US 8,549,053 B2
(45) Date of Patent: Oct. 1, 2013

(54) METHOD OF GENERATING INCREASED APPLICATIONS FOR ENROLLMENT AT EDUCATIONAL INSTITUTIONS

(75) Inventors: William A. Royall, Jr., Richmond, VA (US); Edward B. Freeman, III, Richmond, VA (US); Elizabeth W. Clark, Richmond, VA (US)

(73) Assignee: Royall & Company, Richmond, VA (US)

( * ) Notice: Subject to any disclaimer, the term of this patent is extended or adjusted under 35 U.S.C. 154(b) by 1730 days.

(21) Appl. No.: 09/961,234

(22) Filed: Sep. 24, 2001

(65) Prior Publication Data

US 2002/0040301 A1 Apr. 4, 2002

Related U.S. Application Data

(63) Continuation-in-part of application No. 09/931,749, filed on Aug. 20, 2001, now Pat. No. 7,451,094, and a continuation-in-part of application No. 09/633,897, filed on Aug. 7, 2000, now abandoned.

(60) Provisional application No. 60/234,602, filed on Sep. 22, 2000, provisional application No. 60/226,091, filed on Aug. 18, 2000, provisional application No. 60/205,558, filed on May 22, 2000.

(51) Int. Cl.
*G06F 17/30* (2006.01)
(52) U.S. Cl.
USPC .......................................... 707/959; 707/922
(58) Field of Classification Search
USPC .................... 707/104, 1, 959, 922; 705/1, 8, 705/9, 10, 11, 7.23, 7.29, 7.33
See application file for complete search history.

(56) References Cited

U.S. PATENT DOCUMENTS

| | | | | |
|---|---|---|---|---|
| 5,930,764 A * | 7/1999 | Melchione et al. | .......... | 705/7.29 |
| 5,966,695 A * | 10/1999 | Melchione et al. | .......... | 705/7.33 |
| 6,385,620 B1 * | 5/2002 | Kurzius et al. | ............. | 707/104.1 |
| 6,424,952 B1 * | 7/2002 | Yinbal | .......................... | 705/36 |
| 6,460,042 B1 * | 10/2002 | Hitchcock et al. | ................... | 1/1 |
| 6,464,505 B1 * | 10/2002 | Pocock | ........................ | 434/219 |
| 6,606,744 B1 * | 8/2003 | Mikurak | ...................... | 717/174 |
| 8,290,806 B2 * | 10/2012 | Lee et al. | ..................... | 705/7.23 |
| 2002/0002482 A1 * | 1/2002 | Thomas | .......................... | 705/10 |
| 2002/0174123 A1 * | 11/2002 | Harbaugh | .................... | 707/100 |
| 2004/0138913 A1 * | 7/2004 | Guerra | ............................. | 705/1 |

OTHER PUBLICATIONS

Ma et al., "Targeting the right students using data mining", ACM, pp. 475-464.*
Sherri Yerk-zwicki, "Window to a new world: Online freshman orientation via portal", ACm, pp. 343-345.*

(Continued)

*Primary Examiner* — Jean M Corrielus
(74) *Attorney, Agent, or Firm* — Duane Morris LLP (57) ABSTRACT

A method of increasing the number of applications for enrollment at an educational institution including the profiling of an educational institution's candidate database and inquiry pool against its particular enrollment objectives and personalized communication with selected candidates. The method also provides candidates who are interested in an educational institution with an opportunity and selected incentives to electronically access, complete and submit partial or complete applications for admission. The method also provides for personalized follow-up communications with selected candidates and for the monitoring, compilation and reporting of applications received using the method.

4 Claims, 4 Drawing Sheets

(56) References Cited

OTHER PUBLICATIONS

Nielsen et al., "Current trends in computer science graduate admissions: A survey of the top 108 programs" ACM, pp. 31-34.*

Sharma et al., "Retraining for a graduate program in computer science", ACM pp. 282-288.*

Grady et al., "Sending GMAT score reports to schools: Patterns of requests at registration" dialog, pp. 1-7.*

Tjaden et al., "A Worldwide, web-based study of the attitudes of college freshmen toward computing" ACM, pp. 29-32.*

Judith A. Knapp, "Information systems: Educational offerings vs. Industry needs", ACM, pp. 18-26.*

Noel-Levitz (WWW.noellevitz.com, Newsletter archive, Grading and qualifying prospects, winter 1998 (part 1) and spring 1998 (part 2).*

Schillewaert et al., (Schillewaert, Niels; Langerak, Fred; Duhamel, Tim, "Non-probability sampling for WWW surveys: a comparison of methods," Journal of the Market Research Society, Oct. 1998.).*

Dugan et al., Using GMAC data to develop an admission marketing plan, v13n2 pp. 24-31, Winter 1997).*

Sanoff et al., "The consulting game: schools turn to outside help to target and select students", US News &World Report, v19, n11, p. 119(4), Sep. 1995.*

Gabbott et al., "Marketing information systems in universities", Marketing Intelligence & planning v11n7 pp. 19-28, 1993.*

David A. Holdford, A marketing plan for recruitment students into Pharmacy school-based graduate programs. A report (1,2), American Journal of pharmaceutical education, vol. 64, winter supplement 2000.*

* cited by examiner

METHOD OF GENERATING INCREASED APPLICATIONS FOR ENROLLMENT AT EDUCATIONAL INSTITUTIONS

RELATED APPLICATIONS

This application is a continuation-in-part and claims priority from U.S. provisional application Ser. No. 60/234,602 filed Sep. 22, 2000 and from U.S. provisional application Ser. No. 60/226,091, filed Aug. 18, 2000 and U.S. patent application Ser. No. 09/931,749 filed Aug. 20, 2001 now U.S. Pat. No. 7,451,094 and from U.S. provisional application Ser. No. 60/205,558 filed May 22, 2000 and U.S. patent application Ser. No. 09/633,897 filed Aug. 7, 2000 now abandoned.

BACKGROUND OF THE INVENTION

In an increasingly competitive environment, educational institutions such as colleges and universities strive to identify, solicit and maintain the interest of qualified candidates. This often requires that the educational institution use various techniques to communicate with and retain the interest of interested candidates over a prolonged period of time.

As described in the above referenced applications, the disclosures of which are incorporated by reference herein, traditional methods of communicating with interested candidates includes mailing brochures, catalogues and blank applications to any candidate who has expressed even the slightest interest in attending the educational institution. The educational institution may also use automatic phone dialing service to ascertain and evaluate a candidate's level of interest in attending the educational institution. The educational institution also may sponsor or participate in various receptions, college fairs, open houses, and campus visits. These traditional methods of communication and recruitment may involve significant expense including the cost of selecting appropriate materials, mailing, staff salaries and travel expenses. Moreover, these methods are often limited in their ability to target specific groups of candidates or otherwise fulfill the educational institution's recruitment goals.

The specific recruitment goals and objectives of an individual educational institution, such as a college or university, generally reflect a variety of internal and external factors. These factors may be related to diversity of race, ethnicity, gender, geographic location of candidate, athletic ability, scholastic ability, etc. Each educational institution generally has its own unique set of criteria for the type of candidate that will allow the educational institution to meet its particular goals and objectives. For example, one educational institution may want to become more ethnically diverse while another may want to recruit more women interested in sports. The recruitment goals and criteria used to achieve those goals may vary widely for each individual educational institution. Consequently, there is a need for a systematic approach with sufficient flexibility to accommodate these diverse requirements.

As previously explained in co-pending application Ser. No. 09/633,897, the disclosure of which has been incorporated by reference, a college or university often receives inquiries from prospective candidates expressing an interest in the educational institution or its programs. These initial inquiries can be received as early as the candidate's freshman year in high school and in some instances even earlier. These inquiries may also come in various forms such as correspondence, e-mail, telephone, contact with a recruiter, or the receipt of PSAT or SAT scores. As discussed in the above referenced applications, potentially interested candidates may also be identified based on databases that are collected or provided by various regional or national sources.

Depending on the source of the information, the information provided generally includes the candidate's identity and personal contact information. The candidate data base may also provide additional personal information such as gender, race, ethnicity, relationships with alumni, scholastic and sports interests, etc. The available information about a potential candidate, from whatever source, is typically entered into an educational institution's candidate database. This candidate database is often called an "inquiry pool." Depending upon the nature and size of the educational institution, the number of candidates in an educational institution's candidate data base or inquiry pool may be 100,000 or more.

The traditional application and supporting admission materials are normally prepared and distributed using a "one size fits all" approach. However, since desirable candidates are often considering a number of different educational institutions, the lack of personalization and the burden and expense of acquiring and completing a traditional application form may adversely impact a desirable candidate's interest in completing or submitting an application. Thus, there is a need for improved methods to facilitate the recruitment and application process of educational institutions.

U.S. patent application Ser. No. 09/633,897 describes a novel method for generating applications for enrollment at educational institutions. U.S. patent application Ser. No. 09/931,749 describes a novel method for electronically surveying prospective candidates for admission to educational institutions and encouraging interest in attending. The invention describes an additional method that may be utilized by an educational institution to achieve its recruitment and application objectives.

The method is directed towards increasing applications for admission from interested candidates that have been identified based on the educational institution's specific recruiting goals and objectives. The method also permits personalized follow up communications with candidates and the contemporaneous monitoring, evaluation and reporting of application related information for selected target groups. The method dramatically reduces the cost of ascertaining the interest of the candidates and the time needed to solicit, receive and process applications from interested candidates.

It is an object of the invention to provide a novel method for distributing applications to selected candidates who have expressed a continuing interest in an educational institution.

It is yet another object of the invention to provide a novel method of motivating candidates to provide information relating to their continued interest in enrollment and to submit applications for enrollment.

It is a yet a further object of the invention to provide a novel method for candidates to complete and deliver an application for enrollment at an educational institution as part of a multi-step recruiting and communication program.

It is yet another object of the invention to provide a novel method of increasing the number of applications received by an educational institution from target groups derived from its inquiry pool or other candidate database.

It is a further object of the invention to provide a novel method of providing candidates with the option of completing a customized electronic application.

It is another object of the invention to provide a method for monitoring and evaluating applications received from specific target groups.

It is yet another object of the invention to provide a secure method of electronically submitting applications for admission to educational institutions.

These and many other objects and advantages of the invention will be readily apparent to one skilled in the art to which the invention pertains from a perusal of the claims, the appended drawings, and the following detailed description of the preferred embodiments.

DESCRIPTION OF PREFERRED EMBODIMENTS

The invention uses a specific method to assist an educational institution in achieving the educational institution's recruitment goals in accord with specific criteria and objectives set by the educational institution.

In co-pending U.S. patent application Ser. No. 09/633,897 a novel method for generating applications for enrollment at educational institutions including the profiling and segmenting of candidates is described. In co-pending U.S. patent application Ser. No. 09/931,749 a novel method for electronically surveying prospective candidates for admission and the use of electronic methods to encourage their interest in attending a particular educational institution is described. The present invention builds on the methods described in these co-pending applications and introduces a novel additional approach to the problem of candidate recruiting and related application processes.

Figure 1A:
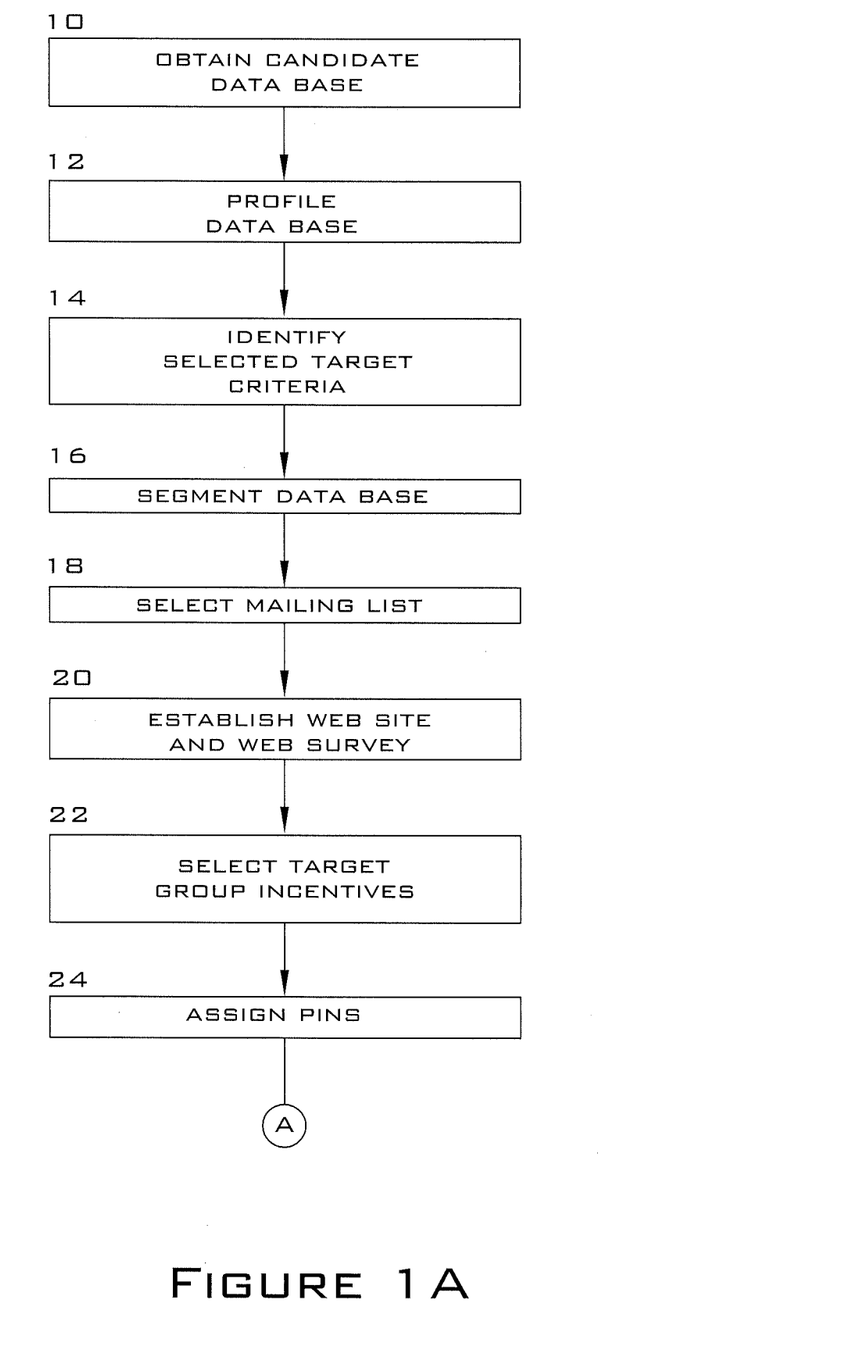
FIGS. 1A through 1D are a diagrammatic flow chart illustrating a method of soliciting and generating applications for enrollment.

FIG. 1A throug 1D illustrate an improved method for generating applications for enrollment from interested candidates and selected target groups. The process begins with the step, Block 10, of obtaining the inquiry pool or other candidate database from the educational institution. The information in the candidate database may be derived from many sources and may also vary significantly in content for the candidates identified therein. The candidate data base is generally embodied in a conventional data base accessible from any suitable conventional input/output device and transported from the educational institution to a remote location for processing by recording on a suitable conventional recording medium or electronically over a hard wired or radio communications link such as a LAN, WAN, the internet or millimeter wave or microwave radio communications channel.

The candidates in the inquiry pool or candidate database may then be profiled in accordance with the specific criteria or characteristics that have been selected by the educational institution. Block 12. The specific criteria or characteristics may include the candidate's high school class year, any prior visits of the candidate to the university and the source of the candidates initial contact with the university. Other criteria such as the candidate's gender, ethnicity, age, place of residence, relationships with alumni, geographic area, etc. may also be considered to the extent that they are available in the candidate data base. Certain of these criteria may also be selectively ignored for purpose of this initial profiling. Alternatively, each of the selected criteria may be weighted in a conventional manner to provide a measure of the desirability of the candidate to the educational institution. Based upon the established characteristics, the application package may be customized and personalized to appeal to particular candidates or target groups.

As shown in Block 14, the educational institution may identify one or more target criteria. The use of these criteria permits the segmentation of the candidate database into sub-populations of candidates who share common characteristics selected by the educational institution based on its enrollment and recruiting goals. Block 16. This segmentation of candidates into one or more selected target groups permits the educational institution to select one or more groups of candidates with whom to communicate. These criteria and characteristics are a function of the specific goals for recruitment established by the individual educational institution.

As shown in Block 18, once the data base has been profiled and segmented, one or more mailing lists of selected candidates or target groups may then be prepared containing those candidates that meet the criteria identified by the educational institution. The mailing list may include both mailing addresses and e-mail addresses as well as other means of contacting the candidates such as telephone numbers, facsimile numbers, or contact with a parent or through a high school or other guidance counselor. It is to be understood here and throughout this application that the term "mailing" includes any and all forms of communication between the educational institution and the candidate, including e-mail or similar forms of electronic communication.

As indicated in Block 20, a web page and web based survey may then be constructed for candidate access. The web page may be specific to the recruiting process or may be part of a larger web site maintained by one or more educational institutions. The web sites and web page may be constructed and maintained according to methods that are well known in the art and may contain one or more interactive sections or features.

In this embodiment, the web page includes links to an electronic survey form. As described in co-pending U.S. patent application Ser. No. 09/931,749, the electronic web survey form can be used to evaluate the continuing interest of candidates in attending the particular educational institution. The web survey form may also include a section that allows the candidate to complete and/or update his/her personal information, such as full name, preferred name, address, phone number, ZIP Code, academic interest, etc.

The web survey form may also incorporate other survey factors to help the educational institution evaluate the interest level of the candidate. These factors may be organized and presented in such a way that the educational institution can rank the importance of each factor to the candidate over a predetermined spectrum of responses. As an example, the candidate may be asked to indicate the importance of each individual factor as: "Not important at all"; "Not very important"; "Somewhat unimportant"; "Neutral"; "Somewhat important"; "Important"; or "Very important".

Other survey response spectra, with more or less choices, are also contemplated by the method. An example of the factors the candidate may be asked to consider are: "Campus safe and secure"; "You [the educational institution] offer majors that interest me"; "You [the educational institution] have an athletics program that fits my needs"; "Extracurricular activities that I enjoy are readily available"; "Admission staff is accessible"; "Faculty care about students as individuals"; "[educational institution] prepares me for a career that interests me"; "The school location is desirable and meets my needs", etc.

The web survey results may be compiled and used to update the candidate database of the educational institution. The compilation of the web survey responses and results can occur as frequently as required by the educational institution and/or may occur after some triggering event, such as a set time period prior to a deadline for mailing applications to candidates. The surveys allow the educational institution to identify interested candidates as well as those candidates who may no longer be interested in the educational institution. The survey information may also be used by the educational institution to evaluate its recruitment program and strategy. The survey results may also be used to identify what candidates believe are the educational institution's strengths and weakness.

One or more web based application forms may also be prepared. The application forms may also be customized by completing selected entries using information which is already available to the educational institution from the candidate data base. This includes such personal information as a candidate's name, address, intended major, extracurricular activities, etc. The educational institution may also elect to customize the web based application by truncating or simplifying the questions, formulating the content of the application to appeal to a specific target group; determining and offering incentives for timely completion and submission of the application; and designing and generating the graphical theme of the letter, package, application, and other material in the application package.

According to this method, the educational institution may also choose to provide selected incentives to encourage candidates to access and complete the web based survey. Block 22. The method permits the educational institution to select and target incentives for each target group. The incentives may also be specifically tailored to the educational institution or the interests of a particular target group of candidates. Depending on the circumstances, such incentives may include: (1) priority of the decision as to admission, (2) priority of scholarship consideration, (3) waiver or reduction of the application fee, (4) waiver or reduction in the personal essay requirements, or (5) priority of housing preference consideration. Other forms of incentive may also be utilized.

Figure 1B:
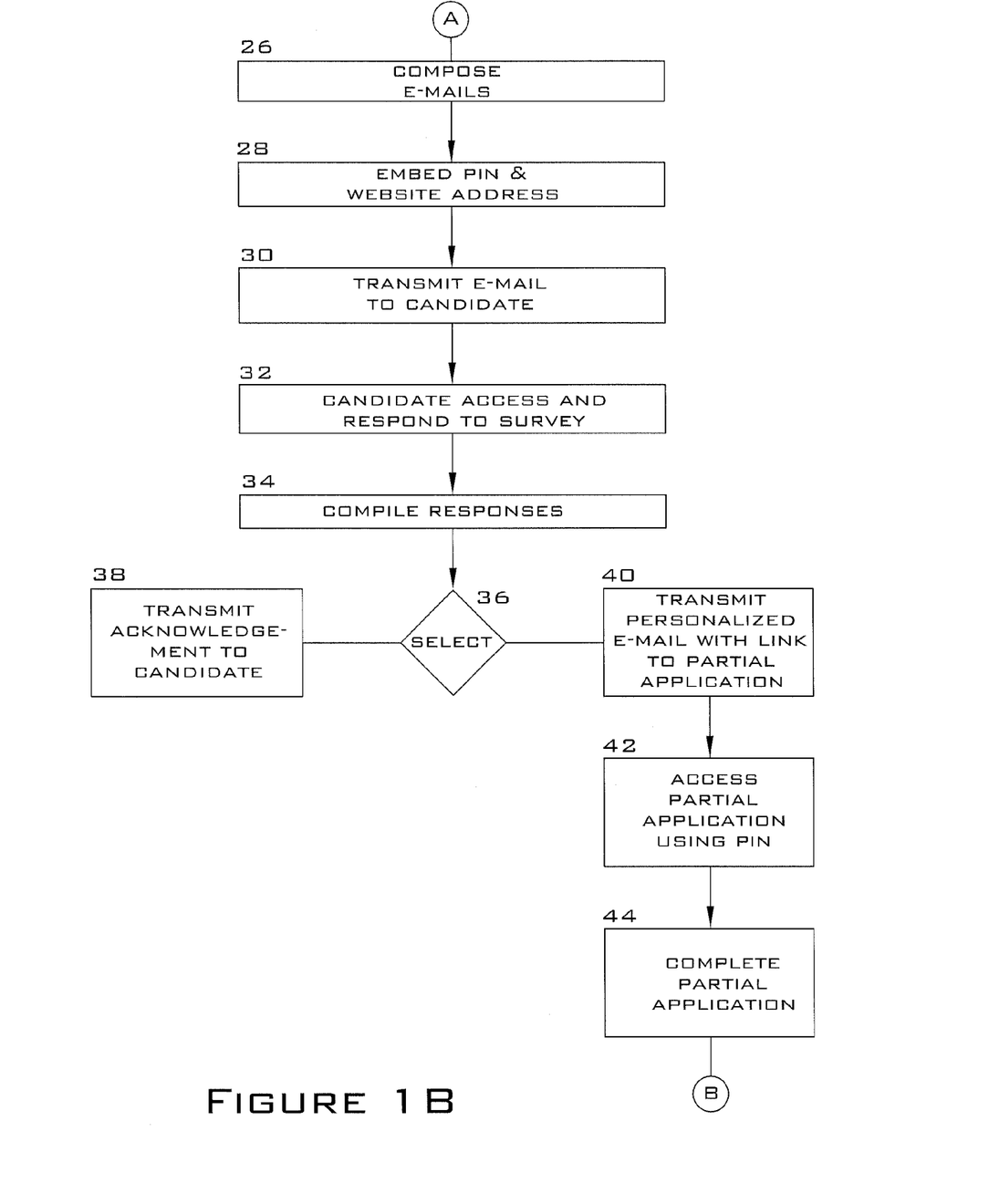

As illustrated in Block 24, a unique access number or PIN is created for each candidate identified in a mailing list. The unique PIN serves to identify each candidate and ensures that each candidate can only access his/her own personal information. The PINs are randomly, not sequentially, assigned and are of sufficient length that the chances of unauthorized access to a candidate's personal information is minimized. The PIN may also be used to ensure that only one survey response or application is submitted by an individual candidate.

As indicated in Block 26, the next steps in this embodiment of the method is to compose a personalized e-mail to selected candidates or target groups, such that a response to the survey will be elicited from the candidate. The e-mail may identify the incentive selected for the candidate or target group. In addition, any personal information known about the candidate, such as his/her name, major preference, or sporting activity preference, may be selectively relied upon or incorporated in the e-mail. Moreover, embedded in each e-mail is the PIN for that particular candidate. Block 28. The unique PIN number and web site address may be embedded by a hyperlink in the e-mail in ways known in the art. The candidate may then be sent a personalized communication containing the PIN and web site address inviting the candidate to access the web site and participate in the survey. Block 30.

As indicated in Block 32, the candidates may use the PIN to access and respond to the web-based survey. The use of the PIN permits the candidate to be identified and the responses from the web survey can be compiled. Block 34. The compilation of the survey responses can occur at any predetermined frequency or upon any pre-selected triggering event. The compilation can also happen at random intervals. The compilation may occur either automatically or upon specific command. As previously described, the results of the survey may also be forwarded to the educational institution.

Figure 1C:
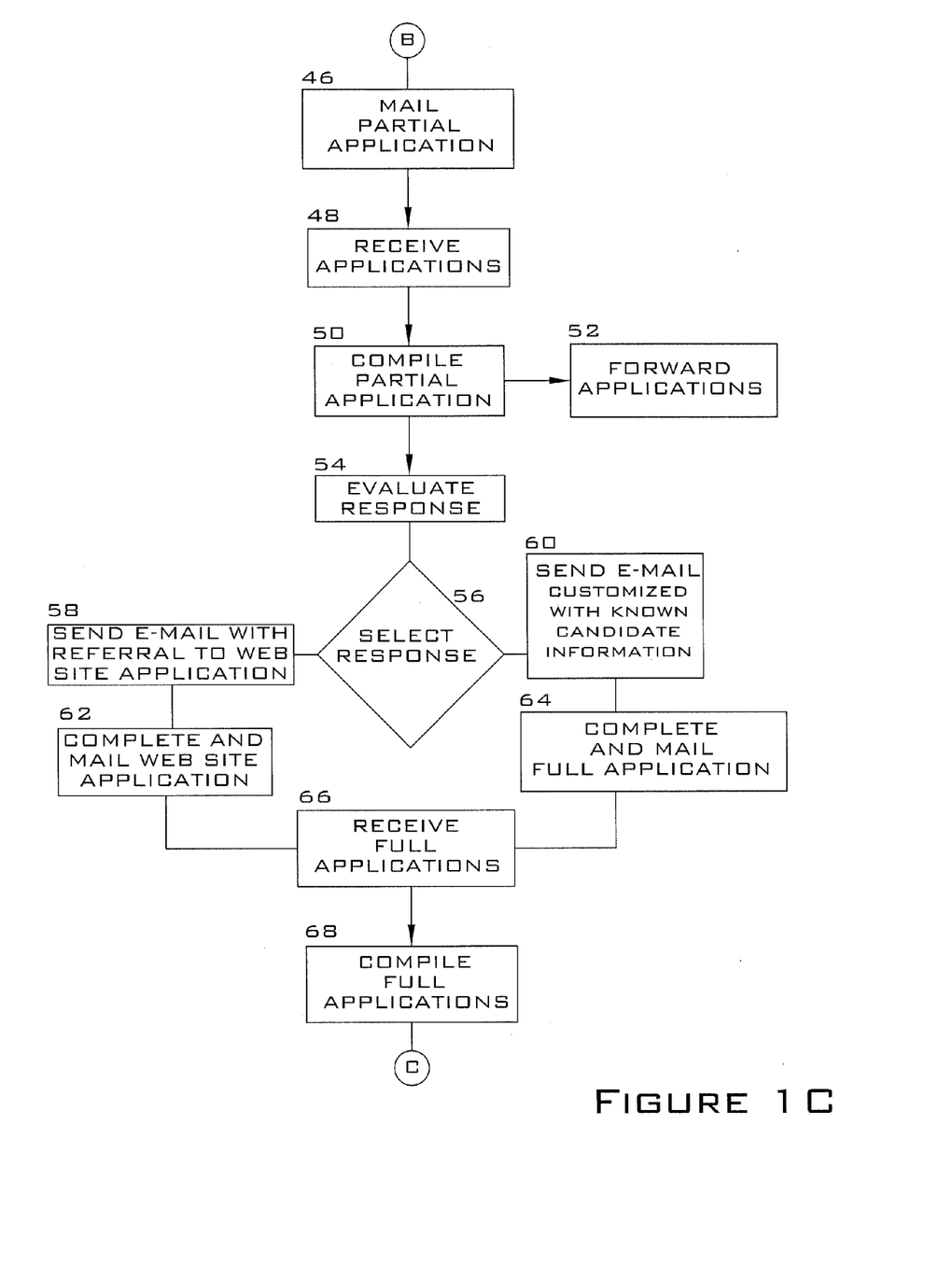

Upon receipt of the electronic survey response, various responses may be selected. Block 36. Thus, a candidate who indicates that he or she is no longer interested in filing an application may receive a personalized acknowledgment of their participation. Block 38.

The candidate who indicates a continuing interest in the educational institution is provided with a link to a customized partial application. Block 40. When a candidate logs on with the assigned PIN and uses the link, the candidate's personal information from the candidate data base is loaded onto the partial online application. Block 42. The candidate may then edit or complete the information contained in the partial application. Block 44. The candidate may then mail the partial application. Block 46.

As indicated in Block 48-54, following receipt of a partial application the partial application may be compiled, forwarded to the educational institution and the responses may be evaluated. The data received may also be used to update the candidate data base.

Figure 1D:
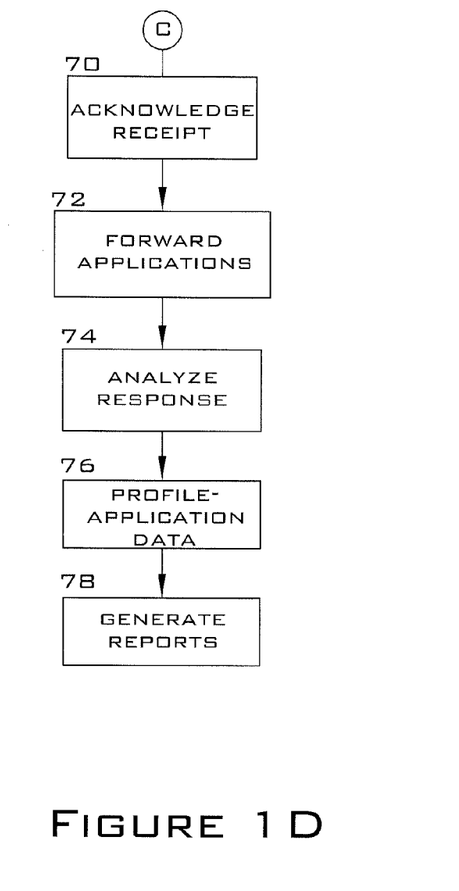

Following receipt of the partial application several additional options are available to an educational institution. Block 56. In some cases, a full application form may be customized with known information about the particular candidate to whom the full application package will be sent. Block 60. Once the personalized application package is prepared, the application package may be mailed directly to the candidate for which that application is personalized. Alternatively, a personalized e-mail may be prepared that directs the candidate to a web based application form. Block 58. This application may be customized and completed in the same fashion as used for the partial application.

As shown in Blocks 62-66, once a candidate has completed and mailed their personalized applications, the application may be forwarded to the educational institution. Block 72. The response data may be compiled, analyzed, and profiled and the data used to monitor and assess the effectiveness of the recruiting and application process. Block 74-78.

The present invention expands upon the method and processes described in the related co-pending applications. Typically, when a candidate indicates an interest in an educational institution, they may answer a few questions, submit their responses and are then finished with the process. Although, this may provide the educational institution with valuable information regarding the candidate and his or her level of interest, it is often difficult for the educational institution to distinguish between candidates who indicates that "I plan to apply" and or students who responds "I'm probably going to apply."

The method provides a means to further evaluate the interest of candidates. The candidate who indicates an intention to file an application is provided with the immediate option of submitting a first portion of the educational institutions application for admission. The application may customized for each candidate because much of the relevant information e.g. name, address, personal information, family information, activities and interests, having already been provided or are otherwise known to the educational institutions. Thus, if a candidate participating in the survey indicates that he or she would like to submit a partial application as part of their response to the survey, it is a simple matter to incorporate the relevant information in an electronic application form for the candidate's review and submission. The candidate can submit a partial application with only a few clicks of the mouse. The candidate who selects the option demonstrates his or her strong interest in attending the educational institution.

The information obtained about each candidate may also be used to customize each application with the candidate's name, address and other selected demographic information. This customization converts an application for admission into a personal invitation to the candidate. Moreover, the content of the electronic application may itself be truncated because the information is already available to the educational institution through the candidate database and thus need not be again requested in the application. This simplification should result in a significantly increased application response rate because candidates are far more likely to complete a shorter, personalized application than a longer, standardized form.

Another important advantage of the present invention is the ability to motivate the candidates to respond. Because of the information available through profiling, it becomes possible to target specific groups of candidates and provide specific incentives for candidates to complete the application for admission and return it to the educational institution. The method also permits the educational institution to select and target incentives for each target group. Depending on the circumstances, such incentives may include: (1) priority of the decision as to admission, (2) priority of scholarship consideration, (3) waiver or reduction of the application fee, (4) waiver or reduction in the personal essay requirements, or (5) priority of housing preference consideration. Other forms of incentive may also be utilized.

The method expands the prospective candidate's application options. At any time, the candidate may elect to apply using the traditional method where the candidate completes a printed application and returns it to the college or university by mail. Interested candidates may also complete a full online application before printing and subsequent mailing. The candidate may also elect to utilize the opportunity to electronically prepare and submit a partial or a full application. As Internet access, competence, and confidence increase, the electronic application option afforded by this and the related co-pending applications are likely to increase in popularity and provide tremendous economic and practical advantages to the candidates and institutions that avail themselves of this opportunity.

The additional security and personalization that is provided throughout the process is also a significant improvement over traditional methods. In this method, each candidate may be provided with a unique personal access number or PIN. By using his or her PIN, the candidate may securely access the web site, survey and application forms. The use of the unique PIN also permits the use of a customized application that already contains the personal information that was contained in the candidate data base used by the educational institution.

The method described in this application also may dramatically improve the number and quality of applications received by an educational institutions. The method also provides improved efficiency and also reduce the cost if inventorying the interest of potential candidates and the processing of applications.

A further advantage of the use of the methods of the present invention is the subsequent analysis of the educational institution's application and recruiting program. The ability to monitor and evaluate the number and quality of applications received using the method provides important feedback to the university and a thorough documentation of the program's success in relation to its stated objectives. The method also permits an educational institution to make adjustments to its recruiting and application program based on its contemporaneous monitoring and evaluation of the program.

The various embodiments of this method permit the real time monitoring of the survey process and periodic tracking of the number and quality of the responses. Based upon the tracking of this information, it is possible to provide a detailed analysis depicting the results of the survey process. These results may be analyzed in conjunction with existing data base profiling to show the school what segments of their mailing population responded well and which segments did not. This analysis may also provide the institution with a thorough documentation of the program's success in relation to their stated objectives, and demonstrates the useful, concrete and tangible results of the school's recruiting and application program.

The various embodiments may be adapted to facilitate variety of customized monitoring approaches. As described in co-pending U.S. patent application Ser. No. 09/931,749, the method may also provide an ability to concurrently monitor and evaluate candidate response and web site activity. The method also permits direct monitoring of a web site to determine who is visiting, the length of time spent and portions of the site that are visited. This monitoring can also provide a listing of recent visits or summary of selected performance criteria or averages. The method may also be adapted to permit the source data base to be updated automatically based on the information provided by candidate's in response to the web based survey or in the application.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for generating applications from candidates interested in attending an educational institution, said method comprising the steps of:
    (a) accessing a candidate database containing personal information;
    (b) profiling the candidates according to criteria established by the educational institution;
    (c) segmenting the profiled candidates into a target group;
    (d) providing a web site containing links to a survey and to a partial application; wherein the survey and partial applications are distinct from each other;
    (e) assigning a unique access number ("PIN") to each candidate in the target group;
    (f) electronically mailing each candidate in the target group the assigned PIN and an invitation to use the PIN to access the web site;
    (g) providing each candidate accessing the web site and indicating a continuing interest in the educational institution with electronic access to the partial application; wherein the indication of a continuing interest is determined from at least the survey;
    (h) for each candidate electronically accessing the partial application, customizing the partial application with personal information from the database;
    (i) compiling the partial applications which have been electronically completed;
    (j) transmitting the completed partial applications to the educational institution;
    (k) providing a personalized acknowledgement of each completed partial application received;
    (l) updating the database with information from the completed partial application;
    (m) inviting each candidate to submit a full application;

(n) providing electronic access through use of the PIN to a full application customized with personal information from the updated database; and (o) offering each candidate invited to submit the full application an incentive to submit the full application, wherein the full application includes questions that are not in the partial application.

2. The method of claim 1 wherein the incentive is selected using criteria established by the educational institution for the target group.

3. A method for generating electronic applications from candidates responding to a web based survey interested in attending an educational institution, said method comprising the steps of:

(a) accessing a database containing information related to candidates having expressed an interest in attending an educational institution;

(b) assigning a unique access number ("PIN") to each candidate;

(c) electronically mailing each candidate a personalized communication that contains the assigned PIN and invites the candidate to use the assigned PIN to access a web based survey;

(d) updating the database with information from the web based survey;

(e) providing each candidate indicating a continuing interest in the educational institution with the opportunity to access a partial application form customized with information from the updated database, wherein the indication of a continuing interest is determined from at least the web based survey;

(f) compiling and forwarding partial applications to the educational institution;

(g) updating the database with information from the partial application;

(h) acknowledging completion of the partial application;

(i) providing electronic access through use of the PIN to a full application customized with personal information from the updated database; and, (j) offering each candidate invited to submit the full application an incentive to submit the full application, wherein the full application includes questions that are not in the partial application.

4. The method of claim 3, wherein the incentive is selected using criteria established by the educational institution for the target group.

* * * * *